(12) United States Patent
Andres et al.

(10) Patent No.: US 8,862,333 B2
(45) Date of Patent: Oct. 14, 2014

(54) METHOD OF DETERMINING THE LATERAL VELOCITY OF A VEHICLE DURING ABNORMAL DRIVING SITUATIONS

(75) Inventors: Robert M. Andres, Clarkston, MI (US); Holger Faisst, Sinzing (DE); Eric Mertz, Rochester, MI (US); Helmut Steurer, Gerolsbach (DE)

(73) Assignee: Continental Automotive Systems, Inc., Auburn Hills, MI (US)

(*) Notice: Subject to any disclaimer, the term of this patent is extended or adjusted under 35 U.S.C. 154(b) by 136 days.

(21) Appl. No.: 13/383,862

(22) PCT Filed: Jul. 16, 2010

(86) PCT No.: PCT/US2010/042275
§ 371 (c)(1),
(2), (4) Date: Apr. 27, 2012

(87) PCT Pub. No.: WO2011/009049
PCT Pub. Date: Jan. 20, 2011

(65) Prior Publication Data
US 2012/0209476 A1    Aug. 16, 2012

Related U.S. Application Data

(60) Provisional application No. 61/226,071, filed on Jul. 16, 2009.

(51) Int. Cl.
*B60R 22/00*    (2006.01)

(52) U.S. Cl.
USPC .................. 701/45; 701/70; 701/74; 701/79; 701/29.1; 180/232; 180/268; 340/438; 340/439

(58) Field of Classification Search
USPC .......... 701/1, 41, 45, 46, 70, 71, 74, 79, 29.1; 180/197, 170, 232, 268; 340/426.16, 340/438, 439
See application file for complete search history.

(56) References Cited

U.S. PATENT DOCUMENTS 4,451,054 A * 5/1984 Allison .................... 280/104
5,428,534 A * 6/1995 Wetzel et al. ............ 701/46
(Continued)

FOREIGN PATENT DOCUMENTS

| CN | 2547585 Y | 4/2003 |
|---|---|---|
| CN | 1655972 A | 8/2005 |

(Continued)

OTHER PUBLICATIONS

International Search Report & Written Opinion mailed on Oct. 8, 2010 for PCT Application No. PCT/US2010/042275.
(Continued)

*Primary Examiner* — Gertrude Arthur Jeanglaud

(57) ABSTRACT

Disclosed is a method to determine a vehicle's lateral velocity during abnormal driving situations of a vehicle during controlled side-impact or rollover crash tests that involve the pulling of a vehicle sideways into an object. A high-resolution, low-range, lateral accelerometer is integrated to determine the lateral velocity. Furthermore, is a method to initiate the integration of the acceleration signal and a method to stop and reset the integration. The method recognizes special conditions associated with abnormal driving situations like controlled crash tests, and therefore will not be active during normal operating conditions. The method also includes a means to handle offset tolerances associated with accelerometers by finding the sensor's zero-g point while the vehicle is at rest.

9 Claims, 3 Drawing Sheets

(56) References Cited

U.S. PATENT DOCUMENTS

| | | |
|---|---|---|
| 6,360,147 B1 | 3/2002 | Lee |
| 6,477,480 B1 | 11/2002 | Tseng et al. |
| 7,057,503 B2 | 6/2006 | Watson |
| 2002/0147533 A1 | 10/2002 | Foo et al. |
| 2003/0051530 A1 | 3/2003 | Eisele et al. |

FOREIGN PATENT DOCUMENTS

| | | | |
|---|---|---|---|
| EP | 0616926 A1 | 9/1994 | |
| EP | 0728624 A2 | 8/1996 | |

OTHER PUBLICATIONS

International Preliminary Report on Patentability for PCT Application No. PCT/US2010/042275 mailed on Jan. 26, 2012.

State Intellectual Property Office of the People's Republic of China Search Report dated Jan. 6, 2014.

\* cited by examiner

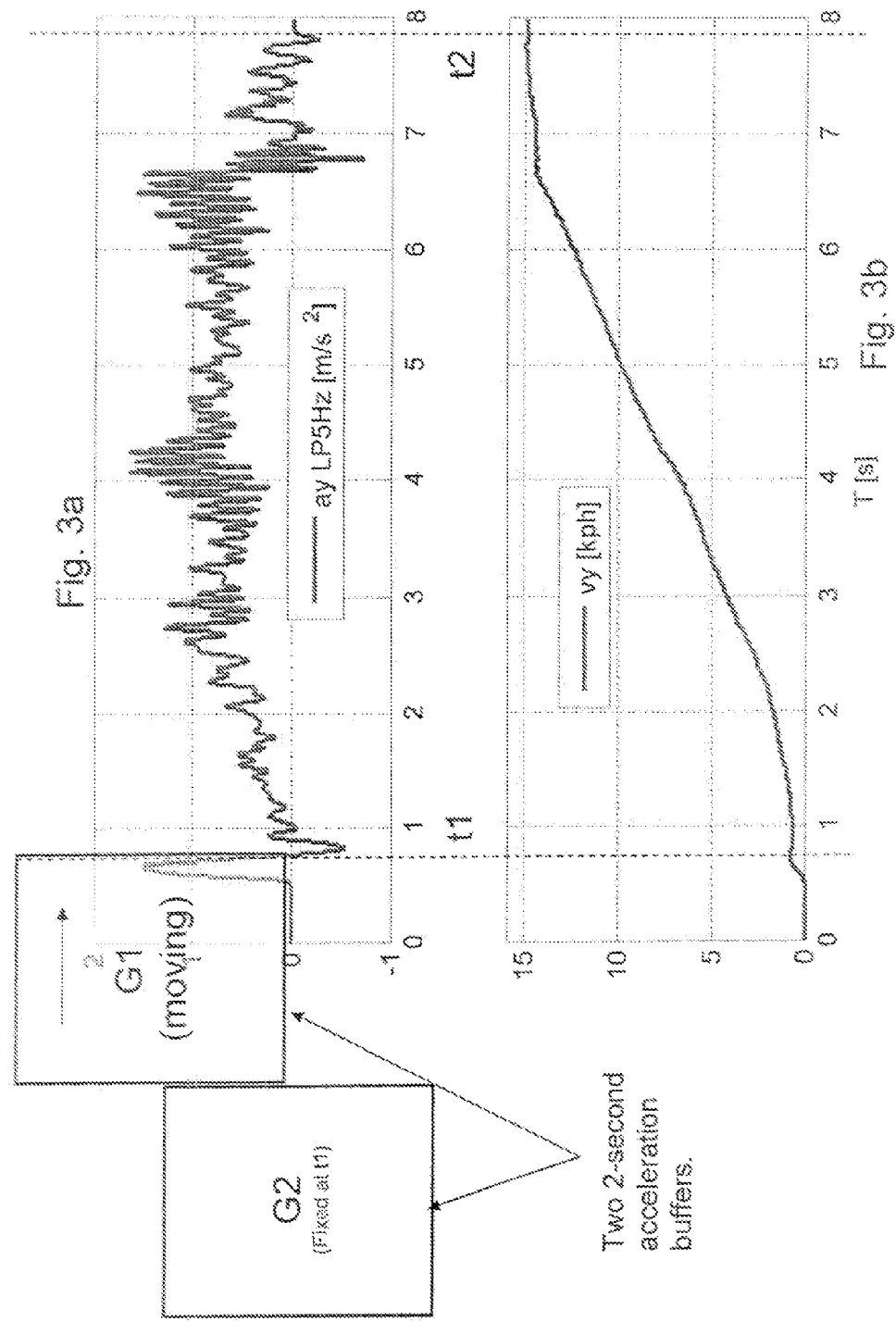

METHOD OF DETERMINING THE LATERAL VELOCITY OF A VEHICLE DURING ABNORMAL DRIVING SITUATIONS

REFERENCE TO RELATED APPLICATIONS

This application is a United States National Phase application of PCT Application No. PCT/US2010/042275 filed on Jul. 16, 2010, which claims priority to U.S. Provisional Application No. 61/226,071 filed on Jul. 16, 2009.

BACKGROUND

It is well known and understood in the vehicle safety industry that knowing the vehicle's lateral velocity just prior to a side impact or a rollover event can greatly improve the performance of the vehicle's occupant restraint system by allowing faster and more robust deployment decisions.

Many present-day vehicles are equipped with electronic vehicle stability systems. These systems consist of various sensors including low-range lateral and longitudinal accelerometers, yaw rate sensors, steering angle sensor, and wheel speed sensors. Using physical principals and models, the vehicle's lateral velocity may be calculated from these sensors. This information may be used by the crash sensing system to enhance performance during side impact and rollover crash events. Sensing systems that use these methods will have good performance in real-world crash situations.

However, in a controlled test situation the sensors that are needed to calculate the vehicle's lateral velocity do not experience the physical forces that normally precede the crash event. For example, if a vehicle is being pulled sideways into an object, then there will be no yaw rate, no wheel speeds, and no steering angle. The only sensor that will experience any physical indication that the vehicle is moving is the lateral accelerometer. In theory, the lateral velocity can be calculated by simply integrating the lateral acceleration. However, the state-of the-art accelerometers are not perfect sensing devices. They are prone to offset drifts and shifts that are within the same range as the pulling force used to accelerate the vehicle towards the impact object. Therefore, the performance of the vehicle's sensing system will not be as good during a crash test as it would be in the real world unless a special test set-up is used to artificially inject the lateral velocity or inject the sensor signals needed to calculate it.

Presently, special test set-ups are not allowed for federally mandated tests. The method described herein allows the vehicle sensor system to calculate and use lateral velocity during controlled crash tests without any special test set-up.

BRIEF DESCRIPTION OF THE DRAWINGS

FIG. 3a is a diagram of a lateral acceleration of the car sidewards during a soil trip sled test carried out at a speed of approximately 15 kph.

FIG. 3b is a diagram of the lateral velocity of a barrier calculation.

DETAILED DESCRIPTION OF THE DRAWINGS

Normal methods for determining the vehicle's lateral velocity are based on driving dynamics models and kinematic equations of motion, which are typically modified by various situation detection methods. These normal methods are not sufficient for controlled barrier crash tests, as special situation detection is required to minimize the real world risk of integrating a gravity influence or sensor offset. The low-range lateral accelerometer is the only sensor that will physically sense the lateral movement of the vehicle during controlled barrier tests. The vehicle is accelerated from rest until it reaches its target speed just prior to impact. The level of acceleration on the vehicle as it is pulled down the path is very low (typical range is 0.05 to 0.5 g) and may even be within the typical offset tolerance of a low-range accelerometer which is approximately 7+/−0.1 g.

Thus, a simple integration of the lateral accelerometer will not give an accurate measure of the lateral velocity unless the absolute zero point of the sensor is known. Therefore a method to determine the accelerometer's absolute zero point while the vehicle is at rest is necessary.

There are several accelerometer zeroing methods well known in the industry. The challenge is that the zeroing of the accelerometer must be stopped as soon as the vehicle starts to be pulled, otherwise, the zeroing method will also start to eliminate the acceleration due to the pulling force, thereby causing the resulting lateral velocity to be greatly underestimated.

Since the lateral acceleration during the test is very low and will occur over a very long period of time, the integration of the acceleration must occur without any dampening factor. Un-damped integrations are prone to mathematical overflow conditions. Therefore, there must be a means to begin and end the integration and preferable additionally means to limit and reset the integration. The proposed integration of the lateral accelerometer itself is already contained within the normal methods for determining the vehicle's lateral velocity (kinematic equations of motion). The invention focuses on a new situation detection method that enables this integration which would normally be suppressed or dampened for field robustness.

Figure 1:
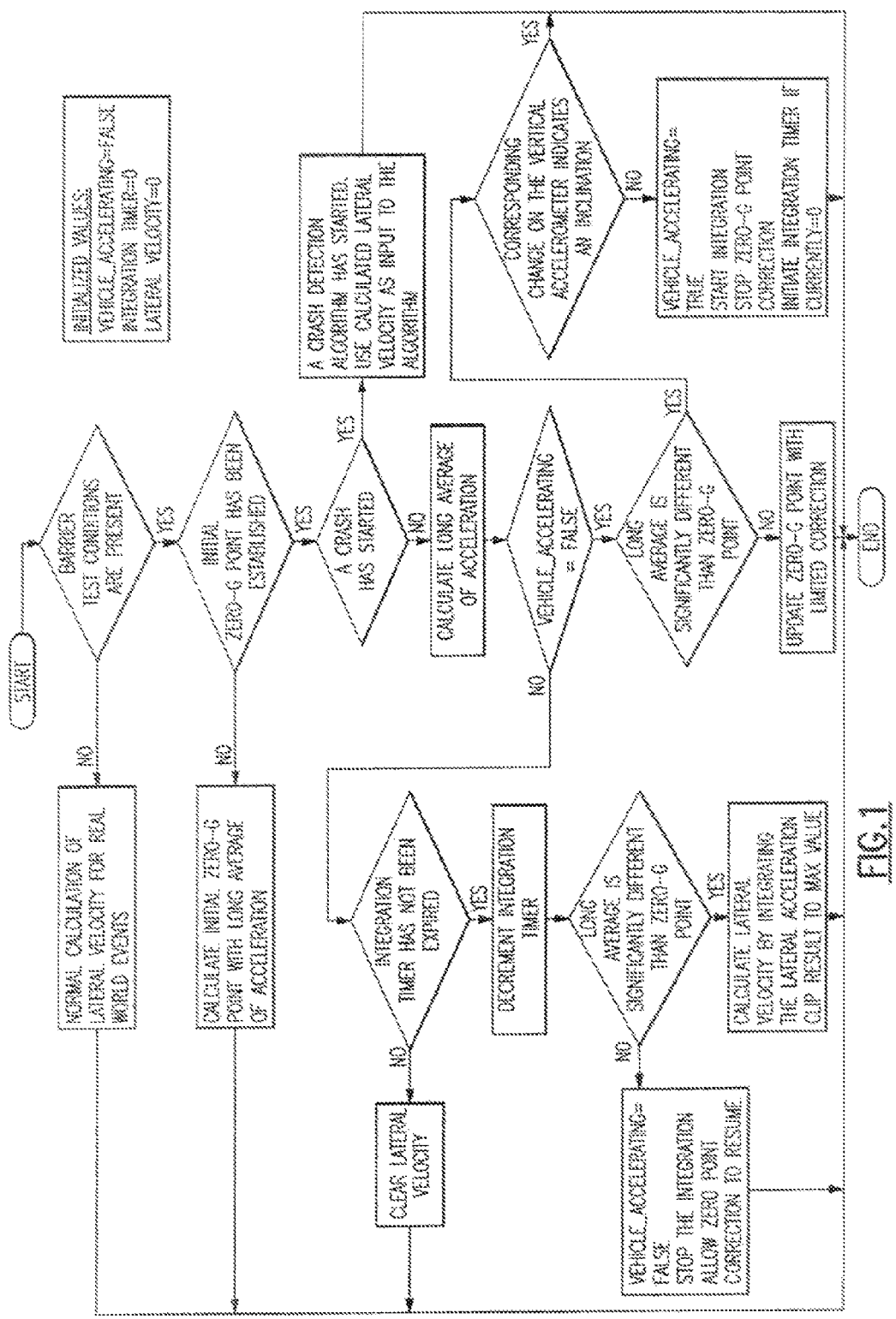
FIG. 1 shows a flow chart of a disclosed method of determining lateral velocity of a vehicle.

FIG. 1 shows a logical flow chart for an embodiment of this method. In this method, while special test conditions are present and the vehicle is at rest, a long average (typical time length is 0.5 to 1 second and may be calibrated) is performed on the lateral acceleration to establish an initial zero-g point. After the initial zero-g point is established, a second long average of the acceleration can be performed within a sliding window. The result of the long average can be compared to the initial zero-g point to determine if the sensor is experiencing normal drift. If nominal sensor drift is occurring then the zero-g point can be adjusted with a limited correction factor. If the difference between the long average and the initial zero-g point is large (threshold is selectable by parameter) compared with normally occurring drift, then the vehicle is either being pulled down a runway or placed on an incline. The low range vertical accelerometer can be checked for a corresponding change to determine if the vehicle has been placed on an incline.

If the vehicle is not inclined and is being pulled down the runway, then the zero-g point correction shall be suspended and the integration of the lateral accelerometer shall be allowed.

The lateral velocity is calculated by integrating the difference between the current lateral acceleration and the accelerometer's zero-g point. The integration shall continue as long as an integration timer has not expired and there is a significant difference between the zero-g-point and the long average. The result of the integration shall be clipped to a maximum value (selectable by parameter) to avoid overflow.

If the difference between the long average and the initial zero-g point becomes very small then the integration can be suspended and the zero-g point correction can be allowed to resume. It is expected that the impact of the crash will occur before the integration timer expires and that the calculated lateral velocity may be used to enhance the performance of the restraint system. The calculated lateral velocity can enhance performance in a number of ways. For example, it can be used to sensitize thresholds or to satisfy a sensor plausibility condition. Due to the sensitive nature of the above mentioned calculations, it is desirable to restrict them to occur only while certain test conditions are recognized and present.

This method proposes at least one of the following conditions to recognize that the vehicle is in a barrier test:
1) the vehicle speed from CAN is very low,
2) the engine RPM is very low,
3) All wheel speeds are very low,
4) The transmission gear is consistent with the prescribed test set-up (usually neutral for automatic transmission or second gear for manual transmission),
5) the parking brake is engaged. Other special test conditions may also be applicable.

Here are other conditions that may be helpful to detect the barrier situation
- Vehicle has not travelled very far during current key cycle—From CAN bus
- The Engine has not run for the current key cycle
- No tires with low pressure
- No radio or HVAC activity
- No windows changing during a time window
- No YAW rate is occurring The thresholds for each condition should be selectable by parameter.

Figure 2:
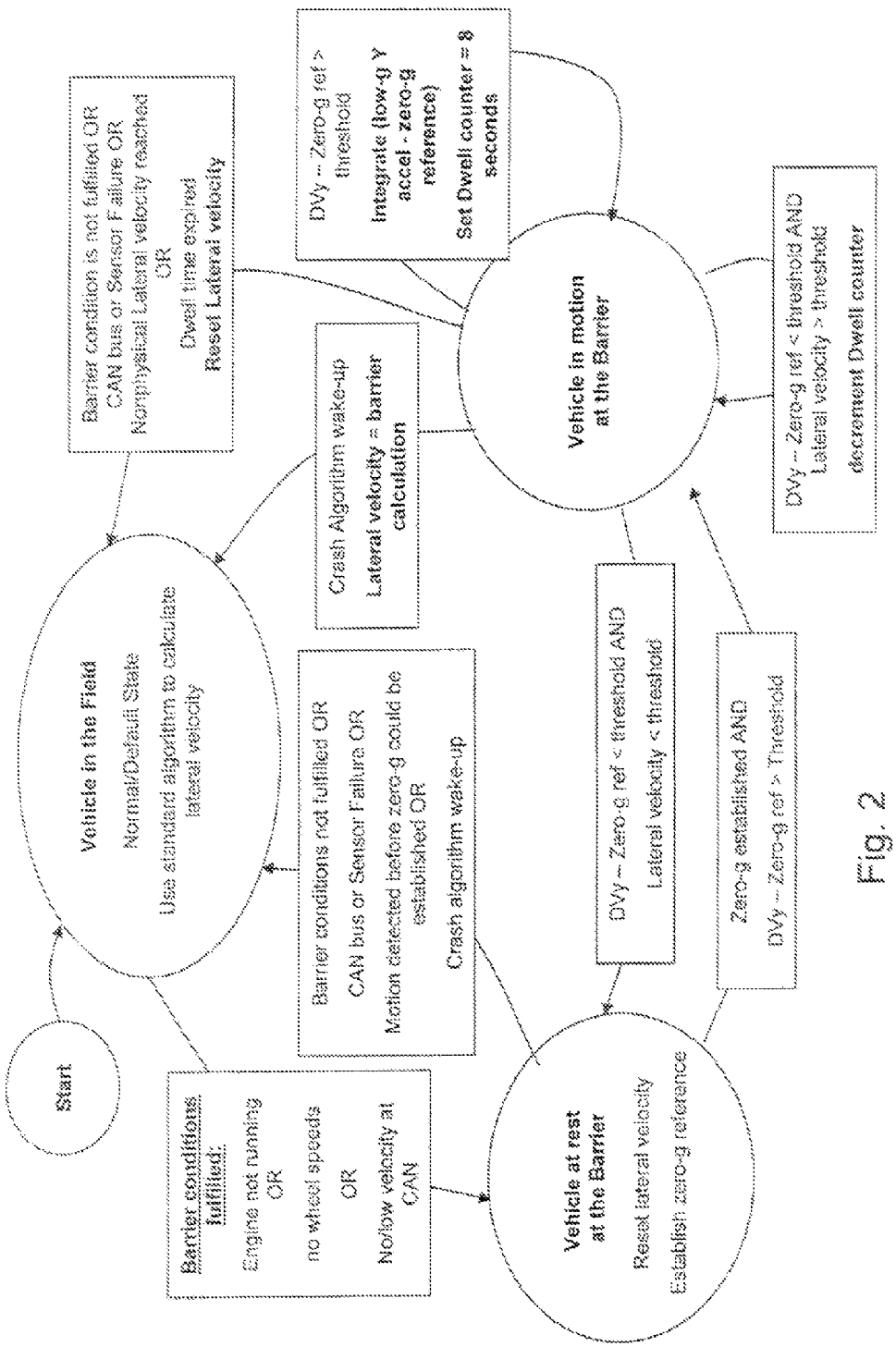
FIG. 2 shows another way of visualization of a similar second embodiment of determining lateral velocity of a vehicle.

FIG. 2 shows another way of visualization of a similar second embodiment of the invention.

FIG. 3a is a diagram showing the lateral acceleration of the car sidewards during a soil trip sled test carried out at a speed of approximately 15 kph and FIG. 3b is a diagram the lateral velocity of the barrier calculation. In this embodiment, two acceleration buffers are used, which have a width of two seconds.

The first buffer G1 works as a running window and the second buffer will be frozen with an initial zero-g-point-value. At t1 the difference between the calculated delta velocity in the first buffer and the calculated delta velocity (DV) in the second buffer is greater than a wake up threshold. The difference is used as the starting point for the lateral velocity calculation. The average value of the second buffer is frozen and is used as the zero-g reference point for integrating future lateral velocity. G2 is now fixed. G1, the moving buffer, increases the integrated values because of the increase of the lateral acceleration.

At t2, the actual acceleration becomes so small, that the difference between the DV in the first buffer G1 and the DV in the second (G2) is now less than a reset threshold. The current value for the lateral velocity is dwelled for 8 seconds and then cleared if no impact event happens.

This method of determining the lateral velocity is used for activation of passenger safety devices under such abnormal driving conditions, especially vehicles crash tests. This so determined lateral velocity is important especially for side crash or roll-over-algorithms to improve activation of passenger safety devices like side airbags or rollover bars. Therefore this method is integrated in the software of a control unit for passenger safety devices saved in the memory of such a control unit.

The invention claimed is:

1. A method of determining a lateral velocity during abnormal driving situations of a vehicle, such as during a controlled vehicles crash test, from a lateral acceleration signal, the method comprising:
   detecting an abnormal driving situation by at least one of the following events;
      a) vehicle speed information delivered from CAN is lower than a predescribed value,
      b) number of revolutions of an engine is lower than a predescribed value or the engine is off,
      c) number of revolutions of vehicle wheels are lower than a predescribed value,
      d) transmission gear is consistent with a prescribed test set-up,
      e) a parking brake is engaged, and
      f) vehicle travel distance during a current key cycle is lower than a predescribed value;
   calculating an initial zero-g-point value from the lateral acceleration signal if an abnormal driving situation is detected;
   detecting a lateral acceleration signal over a minimum threshold and start an integration of the lateral acceleration signal and compare an average value calculated from the integrated lateral acceleration signal with the calculated initial zero-g-point value; and
   if the average value differs from the calculated initial zero-g-point value by more than a predefined threshold use the actual integrated lateral acceleration signal as valid lateral velocity and continue the integration until a predefined stopping condition has been reached.

2. The method of claim 1, wherein after the predefined stopping condition has been reached, the lateral velocity is dwelled for a predefined time and than the lateral velocity is reset or reduced stepwise.

3. The method of claim 1, wherein the integration of the acceleration signal is at least one of clipped to a maximum value or limited by an maximum time of integration.

4. The method of claim 1, wherein the calculation of the initial zero-g-point value is stopped and no valid lateral velocity is submitted, if during the calculation the lateral acceleration signal increases over a predefined value.

5. The method of claim 1, wherein the determination of the lateral velocity from a the lateral acceleration signal is stopped responsive to another crash algorithm becoming active.

6. The method of claim 1, wherein after the stopping condition, the integrated signal is compared with an predefined threshold and if the integrated signal is less than this threshold, the initial zero-point-value is recalculated or corrected.

7. The method of claim 1, wherein the integration is stopped, if the average value differs from the calculated initial zero-g-point less than a predefined threshold.

8. The method of claim 1, wherein the method is used for activating passenger safety devices.

9. A control unit for controlling passenger safety devices of a vehicle comprising;
   a processor for processing a method of determining lateral velocity during abnormal driving situations of a vehicle, such as during a controlled vehicles crash test, from a lateral acceleration signal, the method comprising:
   detecting an abnormal driving situation by at least one of the following events;
      a) vehicle speed information delivered from CAN that is lower than a predescribed value,
      b) a number of revolutions of a vehicle engine is lower than a predescribed value or the engine is off, c) a number of revolutions of vehicle wheels are lower than a predescribed value,
d) a transmission gear is consistent with a prescribed test set-up,
e) a parking brake is engaged,
f) car travel distance during a current key cycle is lower than a predescribed value;

calculating an initial zero-g-point value from the lateral acceleration signal if an abnormal driving situation is detected;

detecting a lateral acceleration signal over a minimum threshold and start an integration of the lateral acceleration signal and compare an average value calculated from the integrated lateral acceleration signal with the calculated initial zero-g-point value; and if the average value differs from the calculated initial zero-g-point value by more than a predefined threshold use the actual lateral acceleration integrated signal as valid lateral velocity and continue the integration of the lateral acceleration signal until a predefined stopping condition has been reached.

\* \* \* \* \*